US 11,750,069 B2

(12) United States Patent
Ekstrom et al.

(10) Patent No.: US 11,750,069 B2
(45) Date of Patent: Sep. 5, 2023

(54) LINE CONDITIONING ACCESSORY AND PROTECTIVE CIRCUIT FOR POWER TOOL

(71) Applicant: Black & Decker Inc., New Britain, CT (US)

(72) Inventors: Erik A. Ekstrom, York, PA (US); Shailesh P. Waikar, Perry Hall, MD (US); Joseph B. Narbut, Parkville, MD (US); Alexandros T. Theos, Bel Air, MD (US); Daniel F. Nace, Towson, MD (US); Zachary S. Olmsted, Vienna, VA (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/474,474

(22) Filed: Sep. 14, 2021

(65) Prior Publication Data

US 2022/0085699 A1 Mar. 17, 2022

Related U.S. Application Data

(60) Provisional application No. 63/079,142, filed on Sep. 16, 2020.

(51) Int. Cl.
*H02K 11/27* (2016.01)
*H02K 5/04* (2006.01)
(Continued)

(52) U.S. Cl.
CPC ............ *H02K 11/27* (2016.01); *H02K 5/04* (2013.01); *H02K 7/14* (2013.01); *H02K 11/04* (2013.01);
(Continued)

(58) Field of Classification Search
CPC . H02K 11/27; H02K 5/04; H02K 7/14; H02K 11/04; H02M 1/32; H02M 1/36;
(Continued)

(56) References Cited

U.S. PATENT DOCUMENTS 9,457,459 B2   10/2016   Tadokoro et al.
9,664,714 B2    5/2017   Chen et al.
(Continued)

FOREIGN PATENT DOCUMENTS

CN   2494053 Y   5/2002
EP   1110678 B1  4/2008
(Continued)

OTHER PUBLICATIONS

EP EESR, dated Mar. 18, 2022 filing in corresponding application No. 21196554.6.

*Primary Examiner* — Adolf D Berhane

(57) ABSTRACT

A power adaptor is provided including a housing receiving a first power cord couplable to a power source through a and a second power cord couplable to a load through a second axial end, a protective capacitor mounted on a circuit board within the housing, a first set of terminals mounted on a first side of the circuit board adjacent the protective capacitor and configured to electrically couple line and neutral wires of the first power cord to the protective capacitor, and a second set of terminals mounted on a second side of the circuit board adjacent the protective capacitor and configured to electrically couple line and neutral wires of the second power cord to the protective capacitor. The protective capacitor is configured to discharge when current draw by the load exceeds a current threshold.

16 Claims, 12 Drawing Sheets

(51) Int. Cl.
*H02K 7/14* (2006.01)
*H02K 11/04* (2016.01)
*H02P 27/06* (2006.01)
*H02M 1/36* (2007.01)
*H02M 7/06* (2006.01)
*H02M 5/458* (2006.01)
*H02M 1/32* (2007.01)
*H02M 1/42* (2007.01)
*H02M 7/00* (2006.01)

(52) U.S. Cl.
CPC ............. *H02M 1/36* (2013.01); *H02M 5/458* (2013.01); *H02M 7/062* (2013.01); *H02P 27/06* (2013.01); *H02M 1/32* (2013.01); *H02M 1/4266* (2013.01); *H02M 7/003* (2013.01)

(58) Field of Classification Search
CPC ...... H02M 5/458; H02M 7/062; H02M 7/003; H02M 1/4266
See application file for complete search history.

(56) References Cited

U.S. PATENT DOCUMENTS

| | | |
|---|---|---|
| 9,871,424 B2 | 1/2018 | Tadokoro |
| 9,960,745 B2 | 5/2018 | Itou et al. |
| 10,065,522 B2 | 9/2018 | Chizuwa |
| 10,322,639 B2 | 6/2019 | Chizuwa |
| 10,536,056 B2 | 1/2020 | Koizumi |
| 2009/0251086 A1* | 10/2009 | Sekimoto ................ H02P 29/50 318/400.23 |
| 2017/0190027 A1 | 7/2017 | Koizumi et al. |
| 2019/0041043 A1 | 2/2019 | Chen |
| 2019/0255958 A1 | 8/2019 | Chizuwa |
| 2019/0358769 A1 | 11/2019 | Miyazawa et al. |
| 2020/0036308 A1 | 1/2020 | Pant |
| 2022/0085699 A1* | 3/2022 | Ekstrom ................ H02P 27/06 |
| 2022/0149760 A1* | 5/2022 | Xu ........................ H02P 6/085 |
| 2022/0305615 A1* | 9/2022 | Wang ...................... H02H 7/09 |

FOREIGN PATENT DOCUMENTS

| | | |
|---|---|---|
| JP | H05130054 A | 5/1993 |
| JP | 11177369 A | 7/1999 |
| JP | 2006269467 A | 10/2006 |
| JP | 3161357 U | 7/2010 |
| JP | 2011061477 A | 3/2011 |
| JP | 5015212 B2 | 8/2012 |
| JP | 2014240120 A | 12/2014 |
| WO | 2019208106 A1 | 10/2019 |

* cited by examiner

LINE CONDITIONING ACCESSORY AND PROTECTIVE CIRCUIT FOR POWER TOOL

RELATED APPLICATION

This patent application claims the benefit of U.S. Provisional Application No. 63/079,142 filed Sep. 16, 2020, which is incorporated herein by reference in its entirety.

FIELD

The present disclosure relates to a power tool having an electric motor being powered by an Alternating Current (AC) power source, and a circuit and/or line conditioning accessory having a circuit for protecting the power source.

BACKGROUND

Some corded power tools include brushless electric motors. Power tools with brushless electric motors use a rectifier to convert an alternating current (AC) input into a direct current (DC) that is used to drive the brushless electric motor. Corded power tools with brushless electric motors also employ a capacitor to lessen ripple and to provide a current when the AC input voltage is unable to do so.

During certain operating conditions, such as high load, the motor may draw too much current from the AC power source, causing a circuit breaker or fuse, including for example, a ground-fault circuit interrupter (GFCI), of the power supply to trip. This may be a problem particularly for power tools configured with high current at start-up—for example, grinders that require high current at start-up to create enough inertia in the output spindle to assist with tightening the accessory on the output spindle. What is needed is a solution that protects the power source from such conditions while preventing frequent tripping of circuit breakers.

This section provides background information related to the present disclosure, which is not necessarily prior art.

SUMMARY

According to an embodiment of the invention, a power adaptor is provided including a housing defining a longitudinal axis formed between a first axial end and a second axial end, the housing receiving a first power cord couplable to a power source through the first axial end thereof and a second power cord couplable to a load through the second axial end thereof. The power adaptor further includes a circuit board mounted within the housing between the first axial end and the second axial end, a protective capacitor mounted on the circuit board, a first set of terminals mounted on a first side of the circuit board adjacent the protective capacitor and projecting towards the first axial end of the housing configured to electrically couple line and neutral wires of the first power cord to the protective capacitor, and a second set of terminals mounted on a second side of the circuit board adjacent the protective capacitor and projecting towards the second axial end of the housing configured to electrically couple line and neutral wires of the second power cord to the protective capacitor. The protective capacitor is configured to discharge when current draw by the load exceeds a current threshold.

In an embodiment, the protective capacitor occupies approximately 20% to 40% of a total length of the housing.

In an embodiment, the protective capacitor includes a capacitance in the range of approximately 15 uF to 60 uF and the load is configured to receive a maximum power input of at least 1100 watts.

In an embodiment, the load comprises a power tool having a motor, an inverter circuit for driving the motor, and a rectifier circuit for providing a direct current to the inverter circuit, the protective capacitor being configured to discharge when current draw by the motor exceeds the current threshold.

In an embodiment, the power tool further comprises a bus capacitor disposed between the rectifier circuit and the inverter circuit, the bus capacitor having a value such that, within each half cycle of AC voltage waveform associated with the power source, a time period within which the motor draws current from the bus capacitor is smaller than a time period within which the motor draws current from the power source. In an embodiment, the protective capacitor is sized to supplement the bus capacitor of the power tool such that a sum of a capacitance of the protective capacitor and a capacitance of the bus capacitor is in between approximately 20 uF to 60 uF. In an embodiment, the capacitance of the protective capacitor is greater than the capacitance of the bus capacitor.

In an embodiment, the housing includes a main portion that houses the protective capacitor, two side portions formed at the first and the second axial ends, and at least one side wall extending in parallel to each of the side portions from the main portion to form an opening adjacent each of the side portions, the opening being configured for passage and mounting of a cable or a zip tie to the housing.

In an embodiment the adaptor further includes a wireless unit being configured to provide a wireless signal for tracking a location of the power module.

In an embodiment, the adaptor further includes a resistor mounted on the circuit board and electrically coupled in parallel to the protective capacitor. In an embodiment, the resistor is mounted on a surface of the circuit board opposite the protective capacitor.

In an embodiment, the circuit board further includes a conductive track electrically connecting a ground of the first power cord to a ground wire of the second power cord bypassing the protective capacitor.

In an embodiment, the housing includes two clamshells and a non-conductive gasket disposed between mating regions of the two clamshells to seal the housing against ingress of water. In an embodiment, the first and second power cords include non-conductive rims arranged to be confined by openings formed by the clamshells at the first and second axial ends of the housing, and the non-conductive gasket and the non-conductive rims cooperating to seal the housing against ingress of water.

According to an embodiment of the invention, a power tool system is provided including a power tool and a power adaptor for conditioning the power input to the power tool. The power tool includes a housing, a motor disposed within the housing, an inverter circuit disposed within the housing configured to switchably supply power to the motor from a power source, a rectifier circuit disposed between the power source and the inverter circuit to convert an alternating-current waveform of the power source to a direct-current waveform, and a bus capacitor disposed between the rectifier circuit and the inverter circuit. In an embodiment, the bus capacitor includes a value such that, within each half cycle of AC voltage waveform associated with the power source, a time period within which the motor draws current from the bus capacitor is smaller than a time period within which the motor draws current from the power source. The power adaptor includes a protective capacitor electrically coupled between the power source and the power tool, the protective capacitor being sized to supplement the bus capacitor of the power tool such that a sum of a capacitance of the protective capacitor and a capacitance of the bus capacitor is in between approximately 20 uF to 60 uF. The protective capacitor is configured to discharge when current draw by the motor exceeds a current threshold.

In an embodiment, the power adaptor is integrally coupled to a power cord received by the power tool.

In an embodiment, the power adaptor is detachably couplable to a power cord received by the power tool.

In an embodiment, the capacitance of the protective capacitor is greater than the capacitance of the bus capacitor.

In an embodiment, the motor is configured to receive a maximum power input of at least 1100 watts.

According to an embodiment, a power tool is provided including a housing; a motor disposed within the housing and configured to receive a maximum power input of at least 1100 watts; an inverter circuit disposed within the housing configured to switchably supply power to the motor from a power source; a rectifier circuit disposed between the power source and the inverter circuit to convert an alternating-current waveform of the power source to a direct-current waveform; a bus capacitor disposed between the rectifier circuit and the inverter circuit, the bus capacitor having a value such that, within each half cycle of AC voltage waveform associated with the power source, a time period within which the motor draws current from the bus capacitor is smaller than a time period within which the motor draws current from the power source; and a protective capacitor electrically coupled between the power source and the rectifier circuit, the protective capacitor being sized to supplement the bus capacitor of the power tool such that the capacitance of the protective capacitor is greater than the capacitance of the bus capacitor and a sum of a capacitance of the protective capacitor and a capacitance of the bus capacitor is in between approximately 20 uF to 50 uF. In an embodiment, the protective capacitor is configured to discharge when current draw by the motor exceeds a current threshold

DRAWINGS

The drawings described herein are for illustrative purposes only of selected embodiments and not all possible implementations and are not intended to limit the scope of the present disclosure.

Figure 3A:
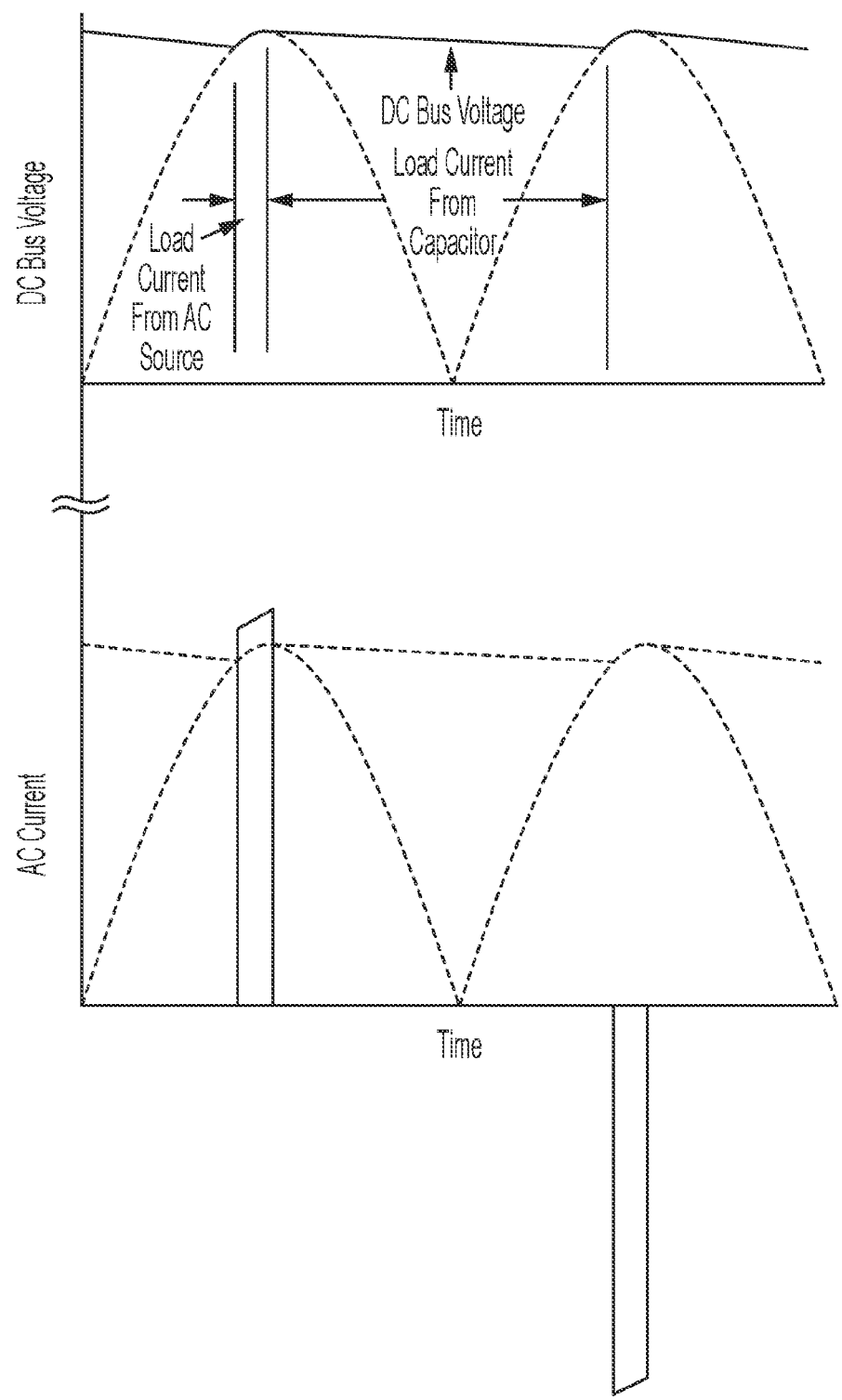
Figure 3B:
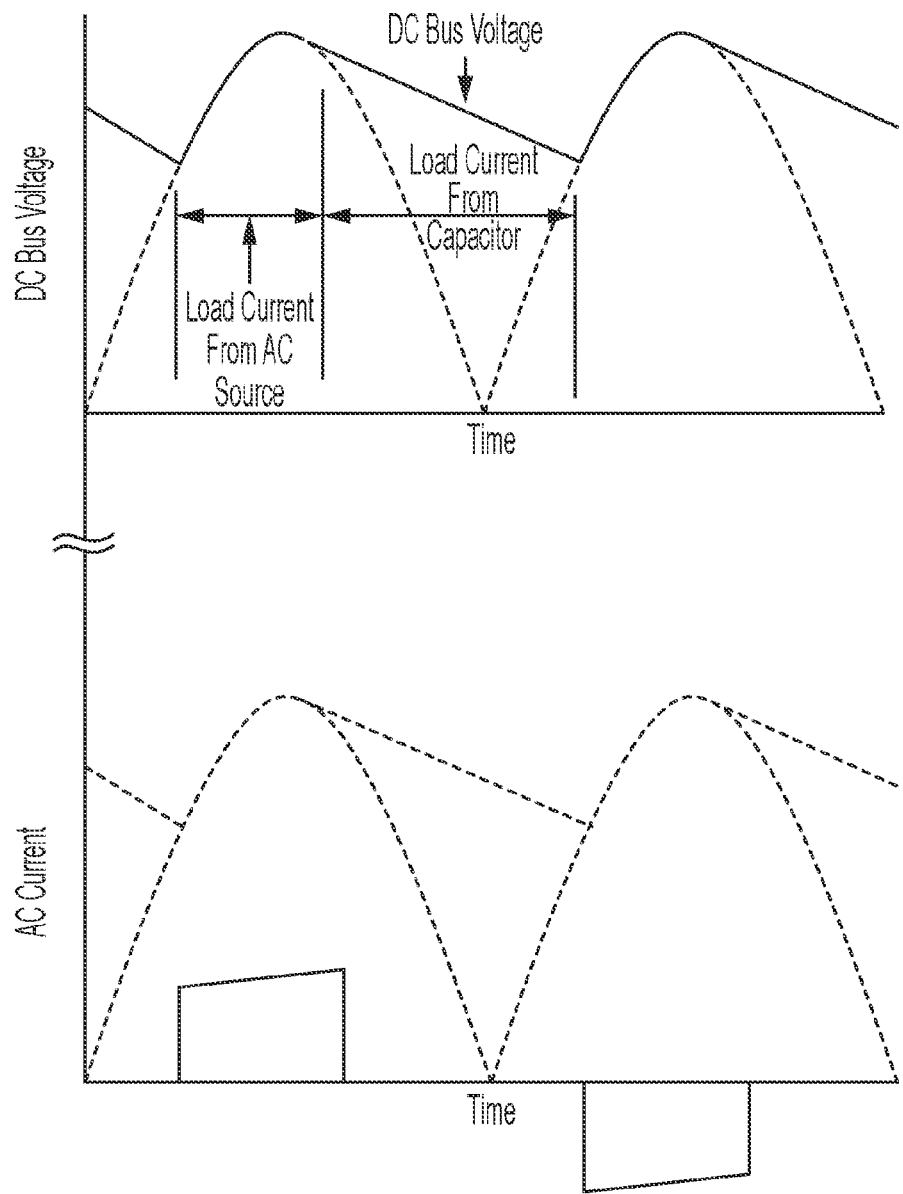
Figure 3C:
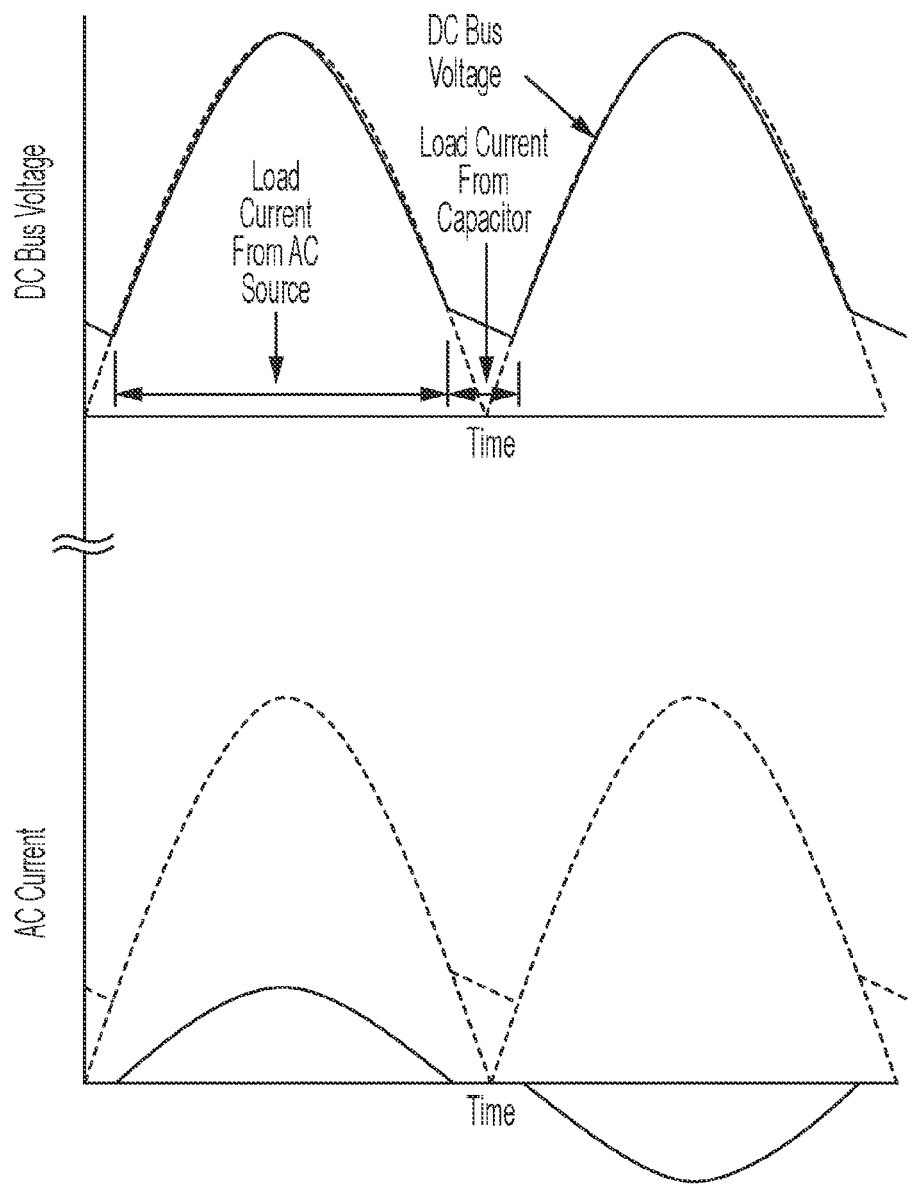
Figure 4:
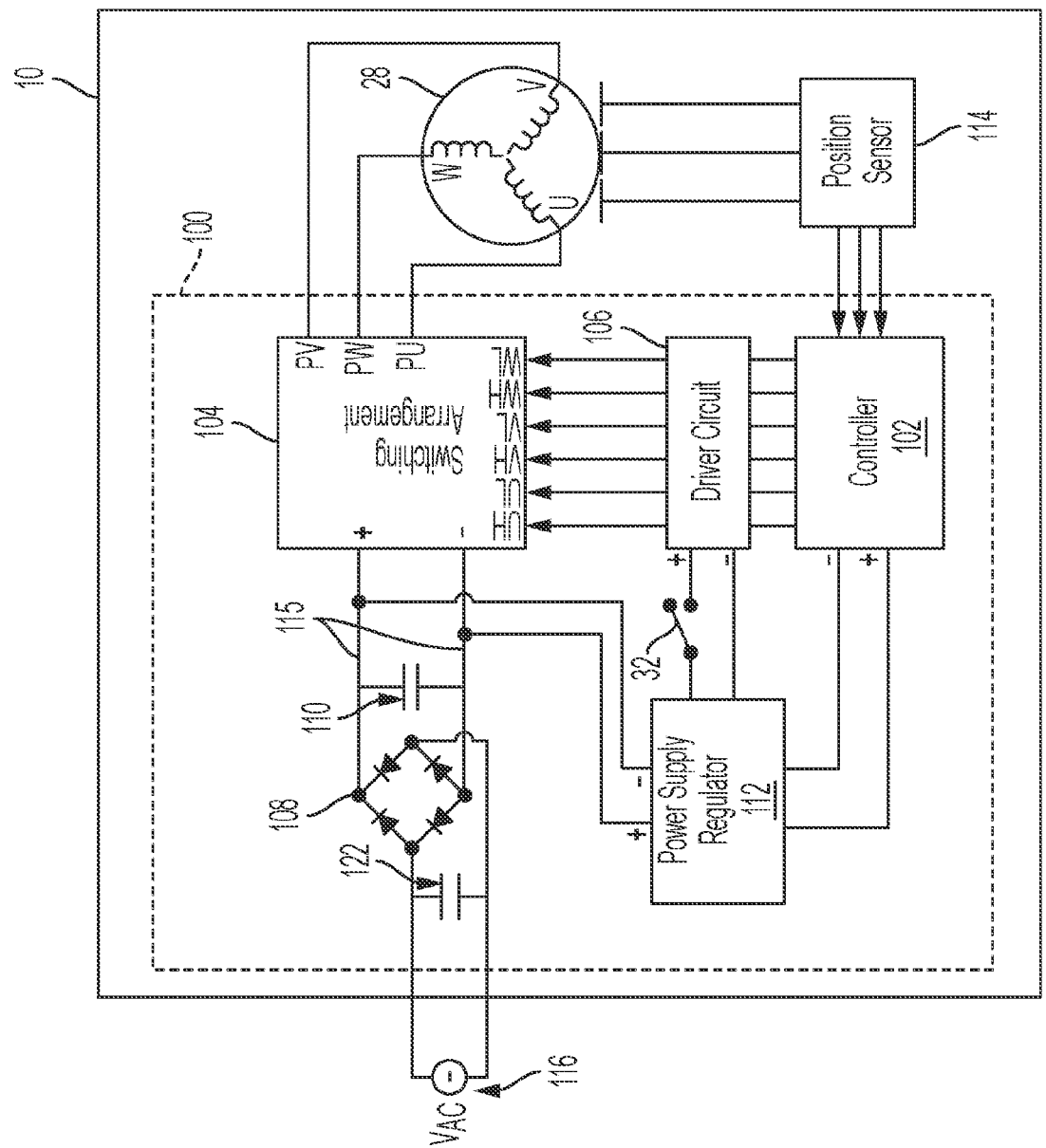
Figure 5:
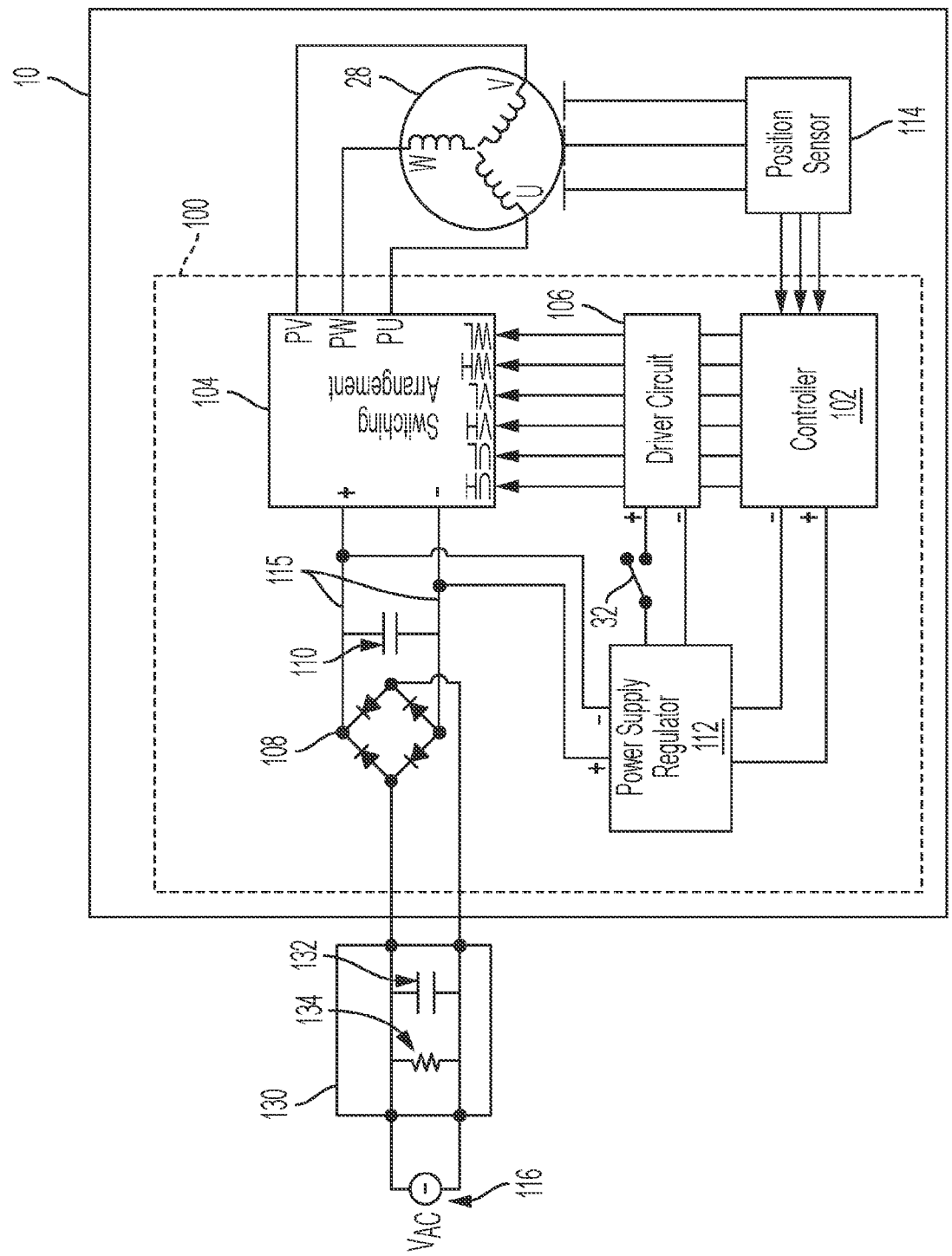
Figure 6A:
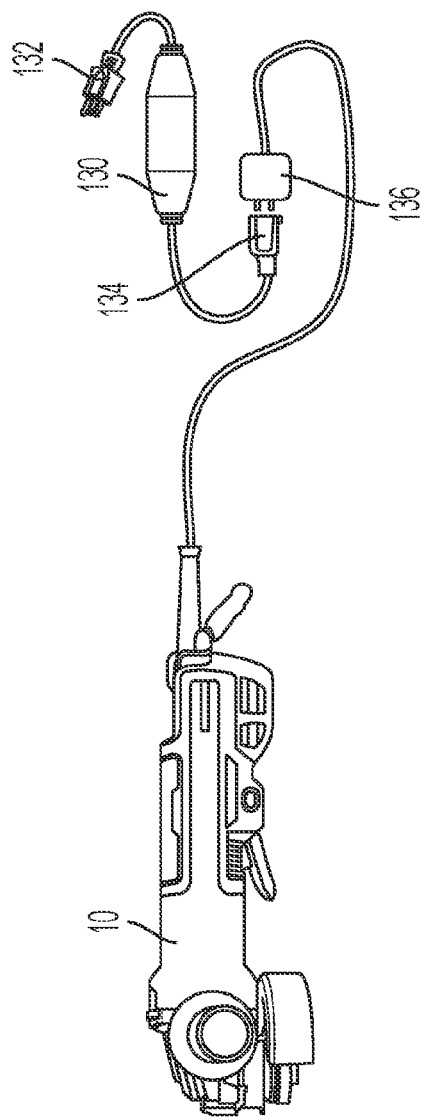
Figure 6B:
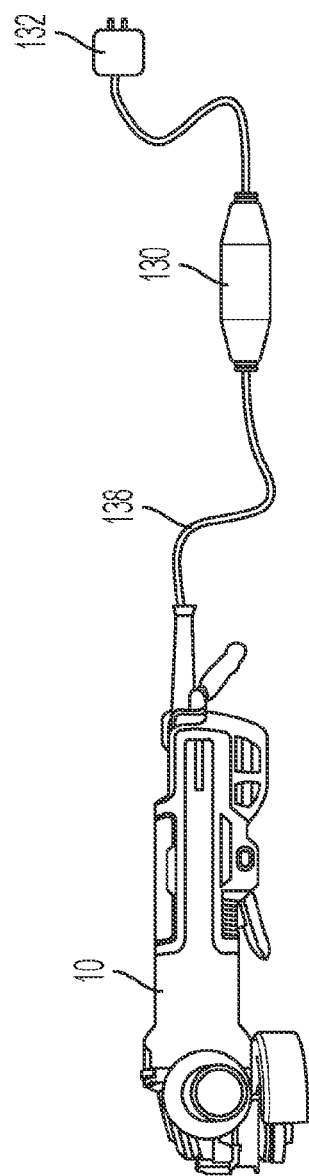
Figure 7:
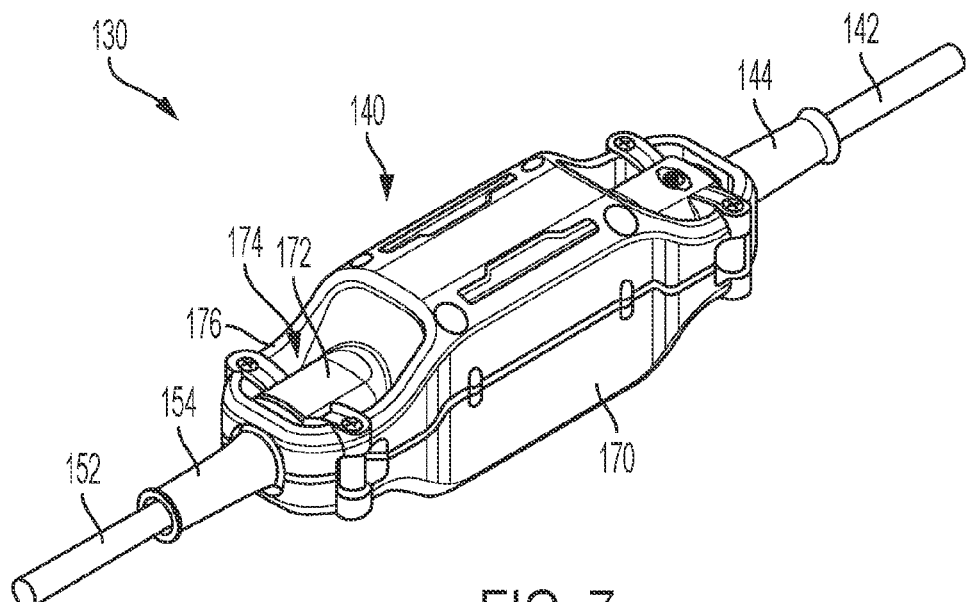
Figure 8:
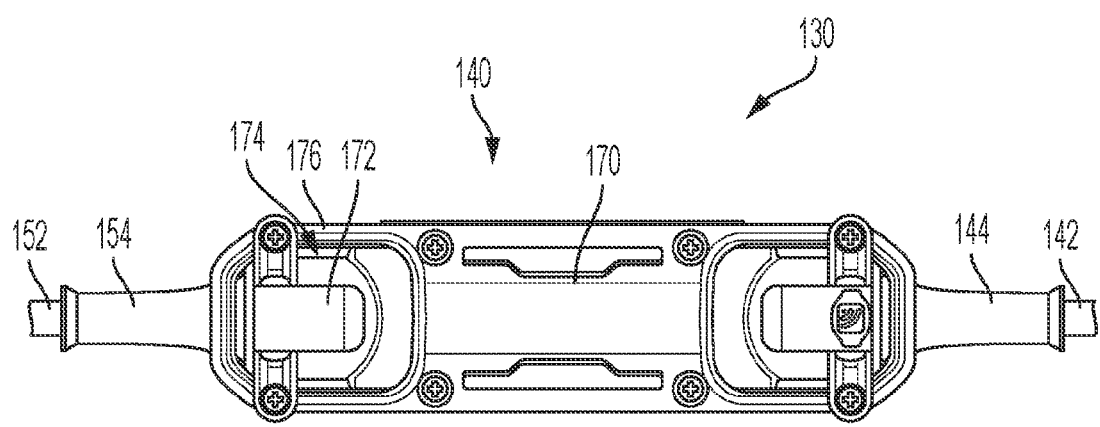
Figure 9:
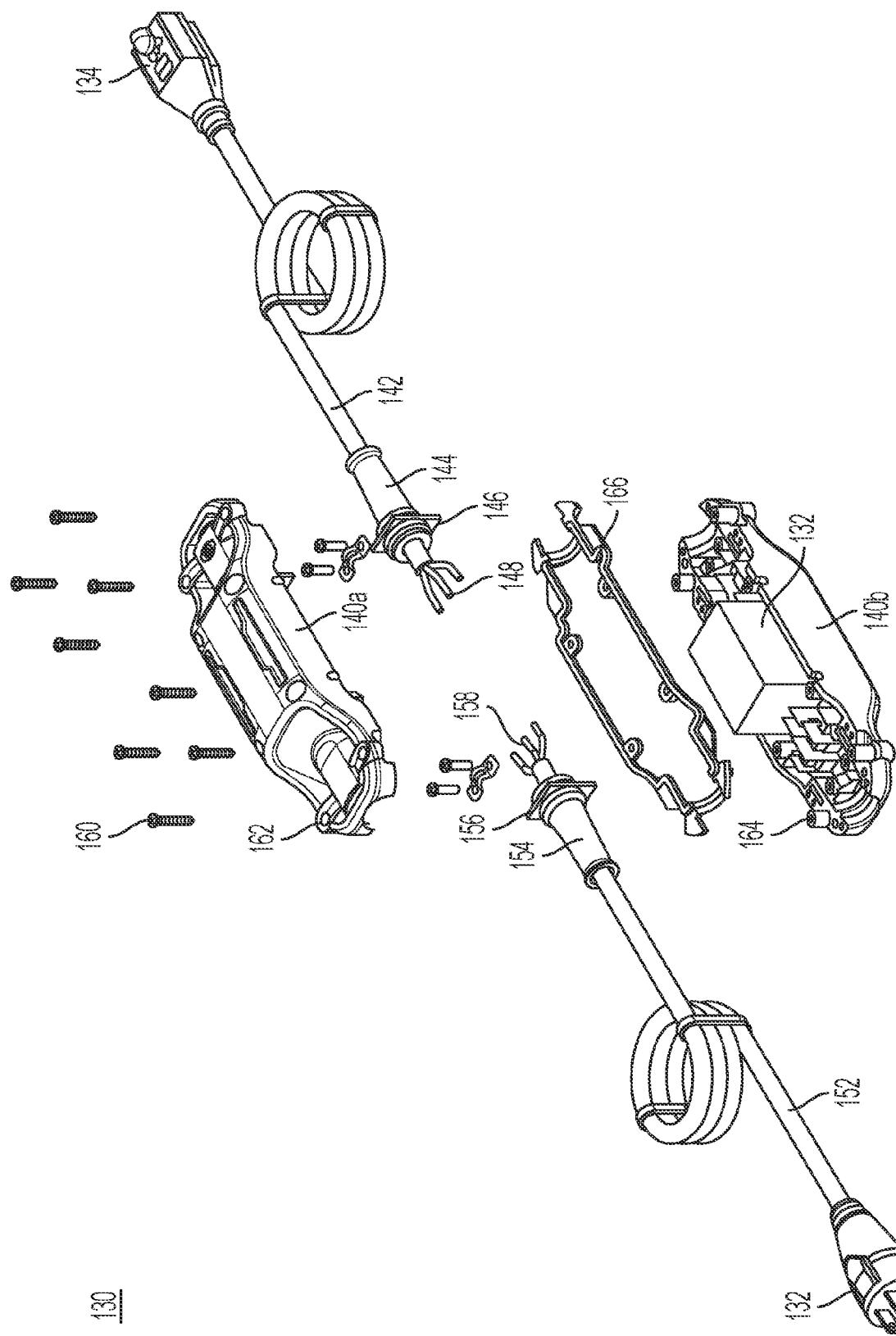
Figure 10:
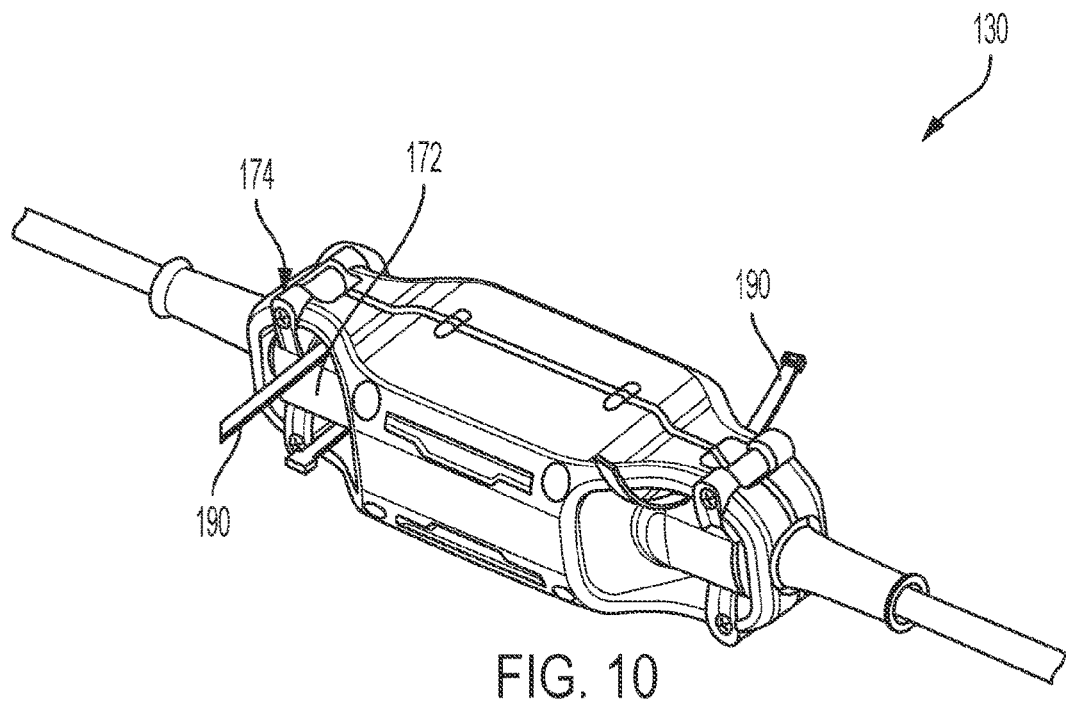
Figure 11:
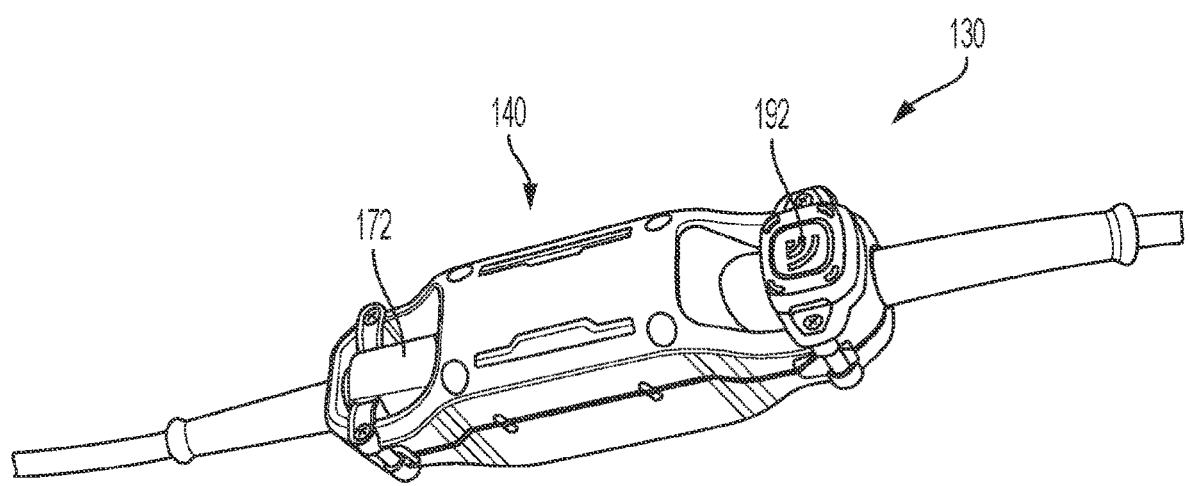
Figure 12:
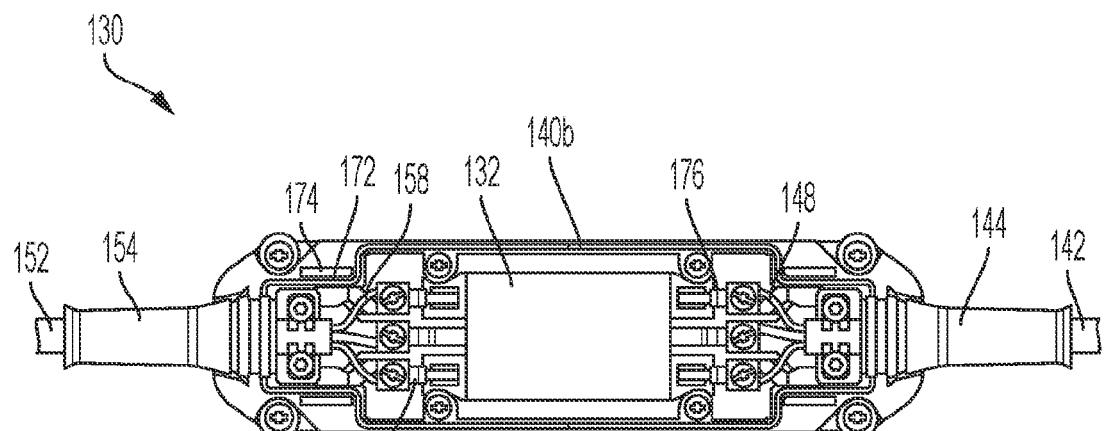
Figure 13:
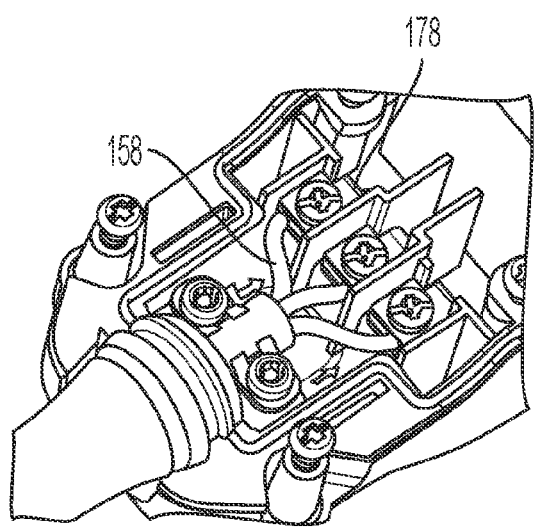
Figure 14:
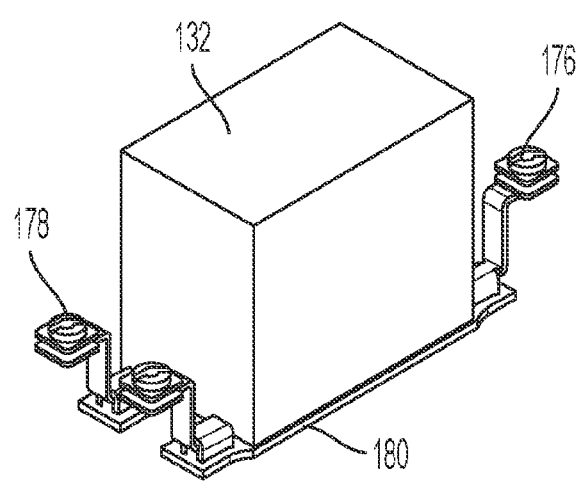

FIGS. 3A, 3B, and 3C are graphs illustrating voltage and current waveforms for different DC bus capacitors utilized in the motor control system, according to an embodiment;

FIG. 4 is a block circuit diagram of the motor control system including a protective capacitor, according to an embodiment;

FIG. 5 is system block circuit diagram of the power tool and a protective adaptor module having a protective capacitor, according to an embodiment;

FIGS. 6A and 6B depict different protective adaptor module connectivity configurations, according to an embodiment;

FIG. 7 is a perspective view of the protective adaptor module, according to an embodiment;

FIG. 8 is a top view of the protective adaptor module, according to an embodiment;

FIG. 9 is an exploded perspective view of the protective adaptor module, according to an embodiment;

FIG. 10 is a perspective view of the protective adaptor module showing a cable and/or zip tie attached, according to an embodiment;

FIG. 11 is a perspective view of the protective adaptor module additionally provided with a wireless tracking or connectivity unit, according to an embodiment;

FIG. 12 is a top view of the protective adaptor module with a housing half removed, according to an embodiment;

FIG. 13 is a partial view of the protective adaptor module depicting the connectivity of the terminals, according to an embodiment; and FIG. 14 is a perspective view of the capacitor board of the protective adaptor module, according to an embodiment.

Corresponding reference numerals indicate corresponding parts throughout the several views of the drawings.

DETAILED DESCRIPTION

Example embodiments will now be described more fully with reference to the accompanying drawings.

Figure 1:
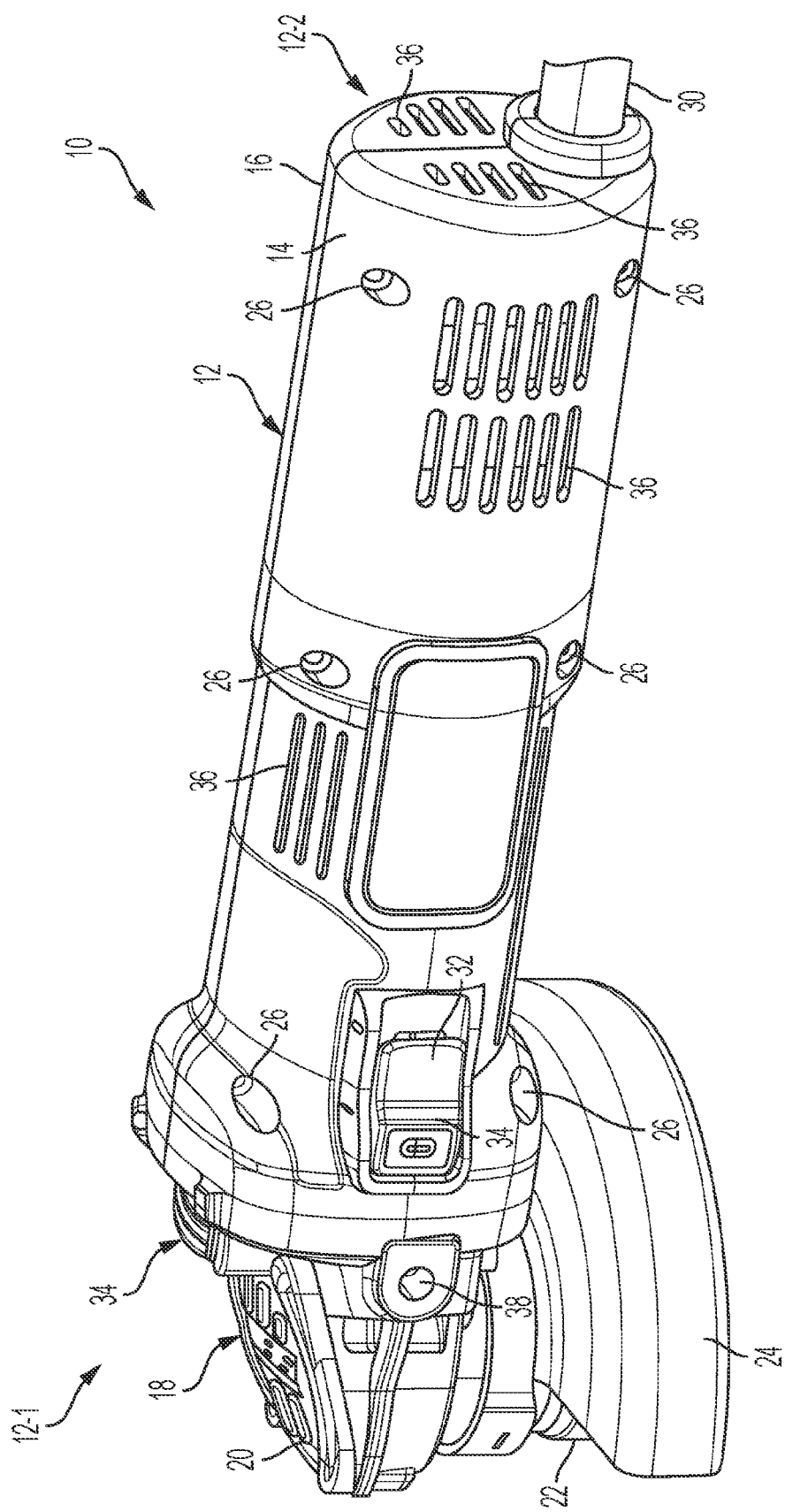
FIG. 1 is a perspective view of a power tool, such as a grinder, according to an embodiment.

FIG. 1 depicts an example power tool 10. In this example embodiment, the power tool 10 comprises a housing 12 having an elongated shape. A user can grasp the power tool 10 by placing the palm of the user's hand over and around the housing 12. An output member 18 is positioned at one end 12-1 of the housing 12 and comprises a right angle gearset 20 that drives a rotating disk 22. In this example embodiment, the rotating disk 22 comprises a grinder disk.

The rotating disk 22 may be removed and replaced with a new rotating disk. For example, a user of the power tool 10 may replace the existing rotating disk 22 with a new rotating disk after the existing rotating disk 22 wears out. An adjustable guard 24 may cover at least a portion of the rotating disk 22 to obstruct sparks and debris generated during operation of the power tool 10.

The housing 12 has a first portion 14 and a second portion 16. The first portion 14 and the second portion 16 may be secured together with screws 26 and enclose an electric motor 28 and electronic circuit components that drive the output member 18. While the present description is provided with reference to a brushless electric motor, the electric motor 28 may be any type of electrical motor capable of driving the output member 18. A power cord 30 is connectable to an AC power supply and is positioned at an opposite end 12-2 of the housing 12. The power cord 30 provides power to the electric motor 28 and the electronic circuit components of the power tool 10.

The first portion 14 further includes a power on/off switch 32 and a spindle lock switch 34. Operating the power on/off switch 32 in ON and OFF positions turns the electric motor 28 ON or OFF, respectively. Pressing and holding the spindle lock switch 34 enables the user to change the rotating disk 22. A plurality of narrow slot openings 36 of the first 14 and second 16 portions allow for venting of the electric motor 28 and the electronic circuit components. The one end 12-1 of the housing 12 also includes a threaded opening 38 for selectively attaching a side-handle (not shown) to enable two-handed operation.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screwdriver bit, thereby allowing the power tool 10 to be used as a power drill or a power screwdriver. In another example embodiment, the output member 18 may be removed and replaced with another output member that may be more suitable for a drill, a screwdriver, or any other power tool.

Figure 2:
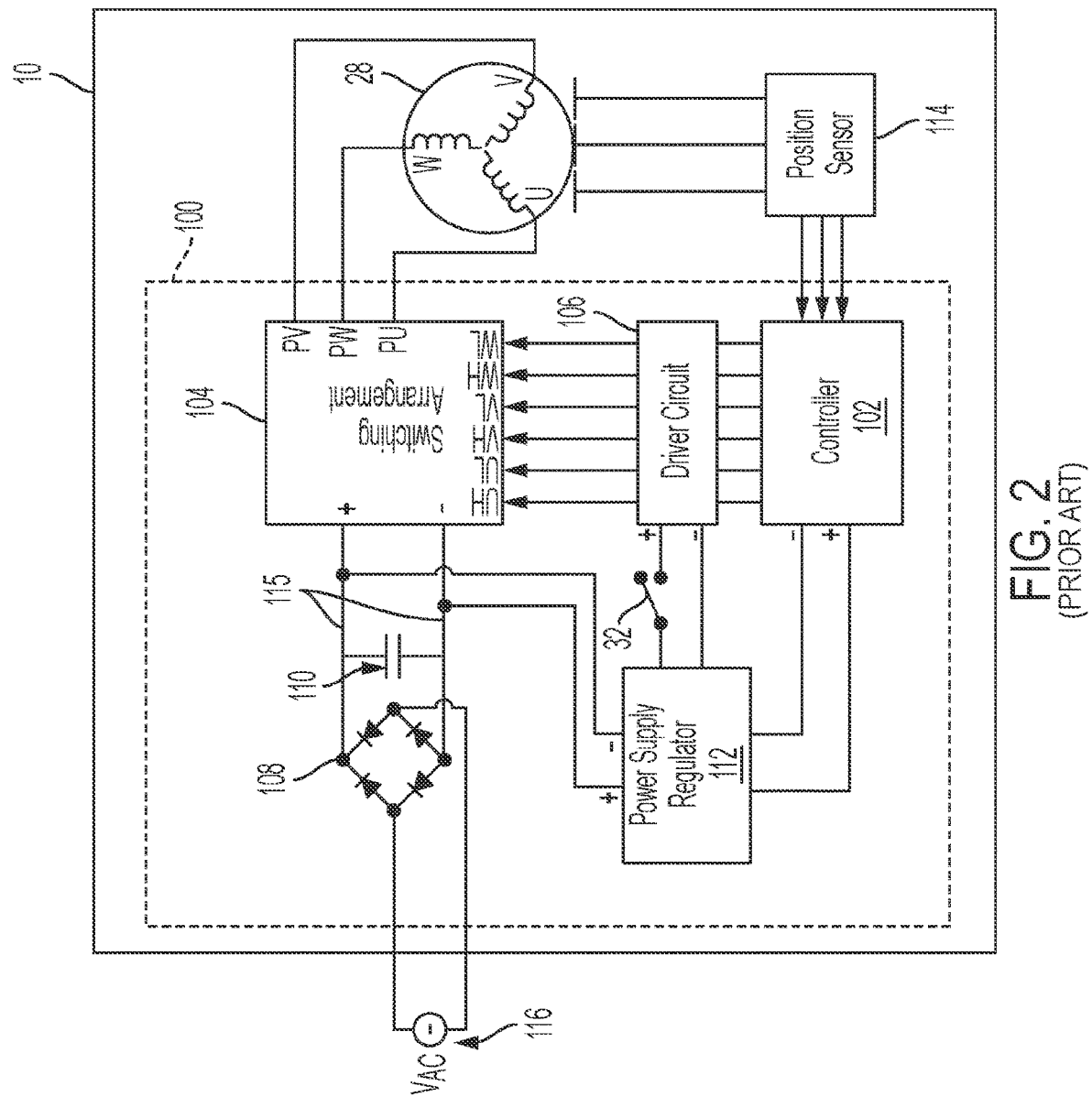
FIG. 2 is an example of a prior art block circuit diagram of a motor control system which may be employed by the power tool.

FIG. 2 depicts a schematic that illustrates an example of a conventional motor control system 100 that may be employed by the power tool 10. The motor control system 100 is comprised generally of a controller 102, a switching arrangement 104, a driver circuit 106, a rectifier 108, and a DC bus capacitor 110, and a power supply regulator 112. The motor control system 100 may further include position sensors 114, such as Hall Effect sensors that are configured to detect rotational motion of the electric motor 28 and generate a signal indicative of the rotational motion. The signal may have a periodic waveform whose magnitude may vary in accordance with the rotational position of the electric motor 28. It should be noted, that other types of positional sensors may be alternatively utilized and should not be limited to Hall effect sensors.

An AC power supply 116 delivers an alternating current to the rectifier 108 through, for example, the power cord 30. The rectifier 108 converts the alternating current into a direct current that is outputted to a DC bus 115 (i.e., power line/bus). The output of the rectifier 108 may be a pulsating DC signal and not a pure DC signal.

The DC bus capacitor 110 is electrically connected in parallel with the rectifier 108 on the DC bus line 115. The switching arrangement 104 is coupled to DC bus 115 line and receives rectified voltage from the rectifier 108 and the DC bus capacitor 110. The switching arrangement 104 includes a plurality of motor switches that, when switched on, deliver the DC current to the electric motor 28. The motor switches may be IGBTs or FETs. The switching arrangement 104 may be further defined as a three-phase inverter bridge although other arrangements are contemplated by this disclosure.

The driver circuit 106 interfaces with the motor switches of switching arrangement 104. The driver circuit 106 controls the state of the motor switches. In the example embodiment, the driver circuit 106 is shown as being separate from the switching arrangement 104. Alternatively, the driver circuit 106 and the switching arrangement 104 may be a single integrated circuit which may be commercially available from various manufactures. For example, the switching arrangement 104, which may include IGBTs, and the driver circuit 106 may be a part of an integrated power module.

The controller 102 interfaces with the driver circuit 106 and may generate PWM signals to control the electric motor 28. In this embodiment, the controller 102 receives power from the power supply regulator 112. In an alternate embodiment, the controller 102 may receive power directly from the rectifier 108.

The power supply regulator 112 is electrically connected in parallel with the rectifier 108 and operates to power the driver circuit 106 via the power on/off switch 32. The power on/off switch 32 is positioned between the power supply regulator 112 and the driver circuit 106.

When the power on/off switch 32 is switched to the ON-position, the driver circuit 106 receives power from the power supply regulator 112. When the driver circuit 106 receives power, the driver circuit 106 is able to control the state of the motor switches and the electric motor 28 is on.

Conversely, when the power on/off switch 32 is switched to the OFF-position, the driver circuit 106 does not receive power from the power supply regulator 112. When the driver circuit 106 does not receive power, the driver circuit 106 is not able to control the state of the motor switches and the electric motor 28 is off.

In the illustrated example, the power on/off switch 32 is electrically connected between the power supply regulator 112 and the driver circuit 106. Thus, the power on/off switch 32 is positioned such that the power from the AC power supply 116 does not pass through the power on/off switch 32. Furthermore, the current being drawn by the electric motor 28 does not pass through the power on/off switch 32. The current passing through the power on/off switch 32 is the current being drawn by the driver circuit 106 and the current being drawn by the driver circuit 106 is lower than the current being drawn by the electric motor 28. It must be understood, however, that in an alternative embodiment, the on/off switch 32 may be a current-carrying switch disposed, for example, on the DC bus line 115 between the rectifier 108 and the switching arrangement 104.

In an embodiment, the DC bus capacitor 110 may be a link capacitor having a relatively small capacitance and does not significantly smoothen the full-wave rectified AC voltage. The DC bus capacitor 110 may be a bypass capacitor that removes the high frequency noise from the bus voltage.

FIGS. 3A-3B highlights the advantages of using a small DC bus capacitor 110 in the power tool 10. FIG. 3A, in an embodiment, depicts the voltage waveform using a relatively large DC bus capacitor 110 (e.g., approximately 400 to 1000 µF) and the associated current waveform. FIG. 3B depicts the voltage waveform using a relatively mid-sized DC bus capacitor 110 (e.g., approximately 50 to 200 µF) and the associated current waveform. FIG. 3C depicts the voltage waveform using a very small DC bus capacitor 110 (e.g., approximately 10 to 30 µF) and the associated current waveform. It is noted that these DC bus capacitor values depend on many factors, most notably the power tool power output requirement. It is noted that exemplary capacitor values provided herein are implemented and tested in conjunction with a circuit as shown in FIG. 2 with max power out of 1.5 to 2 kW.

As shown in FIG. 3A, when using a large DC bus capacitor 110, the current is drawn from the DC bus capacitor 110 for a large portion of each cycle during the capacitor discharge. Thus, current drawn from the AC power supply during each cycle occurs within a small window, which creates a significant current spike. To obtain a constant RMS current of, for example, 10 A from the AC power supply, the current level within the small window increases substantially, which creates the current spikes.

The current spikes in this arrangement are undesirable for two reasons. First, the power factor of the tool becomes low, and the harmonic content of the AC current becomes high. Secondly, for a given amount of energy transferred from the AC source to the tool, the RMS value of the current will be high. The practical result of this arrangement is that an unnecessarily large AC circuit breaker is required to handle the current spikes for a given amount of work.

By comparison, as shown in FIG. 3B, when using a mid-sized, the current is drawn from AC power supply within each cycle occurs within a broader time window, which provides a lower harmonic content and higher power factor. Similarly, as shown in FIG. 3C, when using an even smaller capacitor, the current drawn from the capacitor is very small (almost negligible) within each cycle. Thus, the current drawn from the AC power supply is even broader within each cycle. This provides an even lower harmonic context and a much higher power factor in comparison to FIG. 3A. In FIG. 3C, within each AC cycle, the time period within which the load current is drawn from the capacitor is smaller than the time period within which the load current is drawn from the AC power supply. Additionally, the rectified DC voltage on the DC bus line is smaller than the RMS voltage of the AC power supply.

Additionally, although small DC bus capacitors provide a lower average voltage to the motor control system, it is indeed possible to obtain a higher power output from the AC power supply. In particular, the smaller capacitors enable more power to be drawn from the AC power supply with a lower harmonic context and higher power factor.

For more details on the benefits and advantages of using a small DC bus capacitor in an AC powered or hybrid AC/DC powered power tool system, reference is made to U.S. patent application Ser. No. 14/715,258 filed May 18, 2015, which is incorporated herein by reference in its entirety.

While using a relatively small DC bus capacitor 110 in the system of FIG. 2 provides many advantages, it leaves the power source exposed to high current draw by the motor. This is particularly problematic in motor applications where the motor current exhibits a spike, for example, where the motor controller 102 is configured to apply high current to the motor 28 at start-up to build enough inertia to apply a tightening force to the tool accessory. It has been found that such high current conditions may lead to tripping of many commonplace circuit breakers, particularly GFCI power outlets. This is particularly the case in high-power tools including motors that are rated and configured to receive a high power input, particularly a maximum power input of 1100 watts or greater, and in some cases, a maximum power input of 1250 watts or greater.

FIG. 4 is a block circuit diagram of the motor control system 100 additionally including a protective capacitor 122, according to an embodiment. In this embodiment, protective capacitor 122 is provided within the power tool 10 between the AC power supply 116 and the rectifier 108. Capacitor 122 is optimally selected to have a value to supplement the low capacitance of the DC bus capacitor 110 in order to protect a circuit breaker such as a GFCI power output of the AC power supply 116 from tripping. In an embodiment, the protective capacitor 122 is utilized only if the DC bus capacitor 110 has a sufficiently small value such that, within each AC cycle, the time period within which the load current is drawn from the DC bus capacitor 110 is smaller than the time period within which the load current is drawn from the AC power supply 116, and the rectified DC voltage on the DC bus line 115 is smaller than the RMS voltage of the AC power supply 116. In that case, the protective capacitor 122 is set such that capacitance of DC bus capacitor 110 (C1)+capacitance of protective capacitor 122 (C2) is in the range of approximately 15 uF to 60 uF, preferably in the range of approximately 20 uF to 50 uF, and even more preferably in the range of approximately 25 uF to 50 uF. Accordingly, if the DC bus capacitor 110 (C1) is not at all provided or has a capacitance in the range of approximately 0 to 10 uF, the protective capacitor 122 (C2) is provided with a capacitance in the range of approximately 15 uF to 60 uF, preferably in the range of approximately 20 uF to 50 uF, and even more preferably in the range of approximately 25 uF to 50 uF. If the DC bus capacitor 110 (C1) has a capacitance in the range of approximately 10 to 20 uF, the protective capacitor 122 (C2) is provided with a capacitance in the range of approximately 5 uF to 50 uF, preferably in the range of approximately 10 uF to 40 uF, and even more preferably in the range of approximately 15 uF to 40 uF. In an embodiment, the protective capacitor 122 has a greater capacitance than the DC bus capacitor 110.

FIG. 5 is system block circuit diagram of the power tool and a protective adaptor module 130 including a protective capacitor 132, according to an embodiment. In an embodiment, protective adaptor module 130 is a line conditioning accessory provided on the current path between the AC power supply 116 and the power tool 10. This arrangement provides backward compatibility with existing power tools. In an embodiment, protective capacitor 132 has the same characteristics as protective capacitor 122 described above. In an embodiment, a resistor 134 is provided parallel to the protective capacitor 122.

FIGS. 6A and 6B depict different protective adaptor module 130 connectivity configurations, according to an embodiment. In FIG. 6A, protective adaptor module 130 is coupled to an AC plug 131 on one end, which may be a two-prong or a three-prong AC plug, and to a female receptacle 133 on the other end. Female receptacle 133 is provided to receive an AC plug 136 of the power tool 10. In an embodiment, a cover may be provided around the female receptacle 133 and the AC plug 136 to ensure that the two do not detach so users are prevented from using the power tool 10 without the protective adaptor module 130. In FIG. 6B, protective adaptor module 130 is provided on the power cord 138 of the power tool 10 during the assembly of the power tool 10 or by a service center.

An exemplary configuration of the protective adaptor module 130 is described herein.

FIG. 7 is a perspective view of the protective adaptor module 130, according to an embodiment. FIG. 8 is a top view of the protective adaptor module 130, according to an embodiment. FIG. 9 is an exploded perspective view of the protective adaptor module 130, according to an embodiment.

As shown in these figures, power adaptor module 130 includes a housing 140 made up of two clamshells 140a and 140b that come together around protective capacitor 132 and other components. Power cords 142 and 152 are coupled to ends of the housing 140. A sleeve 144 is provided around the end of the cord 142 and includes a rim 146 that is confined by a first opening of the housing 140. Similarly, sleeve 154 is provided around the end of the cord 152 and includes a rim 156 that is confined by a second opening of the housing 140. Cords 152 and 152 include wire sets 148 and 158. Wire sets 148 and 158 each includes a line and neutral wire and, in addition, optionally a ground wire. The line and neutral wires of each wire set 148 and 158 are coupled to the protective capacitor 132, and the ground wire, if provided, bypasses the protective capacitor 132.

In an embodiment, a non-conductive gasket 166 is provided between the two clamshells 140a and 140b which, combined with non-conductive rims 146 and 156, protect against ingress of water into the housing 140. In an embodiment, the clamshells 140a and 140b are secured to each other via a series of fasteners 160 received through openings 162 of clamshell 140a and fastened into threated openings 164 of clamshell 140b.

In an embodiment, housing 140 includes a main (central) portion 170 that houses the protective capacitor 132 and two side portions 172 that extend from the two ends of the main portion 170 to receive ends of the cords 142 and 152 and the wires 148 and 158. The main portion 170 has a larger width (or diameter) than the two side portions 172. Two side walls 176 extend substantially in parallel along two sides of each side portion 172 from the main portion 170 at a distance from the side portion 172, forming two openings 174 on two sides of each side portion 172. The two openings are oriented along a plane formed by the mating portions of the clamshells 140a and 140b. The openings 174 can be used for passage and mounting of a zip tie or a cable.

FIG. 10 is a perspective view of the protective adaptor module 130 showing a cable and/or zip tie 190 attached through openings 174, according to an embodiment.

FIG. 11 is a perspective view of the protective adaptor module additionally provided with a wireless unit 192, according to an embodiment. In an embodiment, wireless unit 192 may be a tracking or connectivity module employing Bluetooth or other technology to track and trace the location of the protective adaptor module 130. US Patent Publication No. 2019/0097668 and U.S. Pat. No. 9,357,348, which are incorporated herein by reference in their entireties, provides descriptions of such a wireless unit 192 and a system capable of communicating with the wireless unit 192.

FIG. 12 is a top view of the protective adaptor module 130 with clam shell 140a removed, according to an embodiment. FIG. 13 is a partial view of the protective adaptor module 130 depicting the connectivity of wires 158 to terminals 178, according to an embodiment. FIG. 14 is a perspective view of a capacitor board 180 of the protective adaptor module, according to an embodiment.

As shown in these figures, capacitor board 180 is provided within the housing 140, in this case within clamshell 140b. Protective capacitor 132 is mounted on the upper surface of the capacitor board 180. In an embodiment, resistor 134 (not shown in this figure) may be mounted on a lower surface of the capacitor board 180 and coupled in parallel to the protective capacitor 132. Terminals 176 are provided on one side of the capacitor board 180 to receive the wire set 148 (i.e., line and neutral wires) from the cords 142. Similarly, terminals 178 are provided on the other side of the capacitor board 180 to receive the wire set 158 from the cords 152. In an embodiment, a third terminal (not shown in FIG. 14) may be further provided on each side to receive ground wires of the two wire set 148 and 158 and connect them directly via a conductive track on the PCB and bypassing the capacitor 132. In an embodiment, protective capacitor 132 occupies approximately 25% to 40% of the total length of the protective adaptor module 130.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The invention claimed is:

1. A power adaptor comprising:
   a housing defining a longitudinal axis formed between a first axial end and a second axial end, the housing receiving a first power cord couplable to a power source through the first axial end thereof and a second power cord couplable to a load through the second axial end thereof;
   a circuit board mounted within the housing between the first axial end and the second axial end;
   a protective capacitor mounted on the circuit board;
   a resistor mounted on the circuit board and electrically coupled in parallel to the protective capacitor;
   a first set of terminals mounted on a first side of the circuit board adjacent the protective capacitor and projecting towards the first axial end of the housing, the first set of terminals being configured to electrically couple line and neutral wires of the first power cord to the protective capacitor; and
   a second set of terminals mounted on a second side of the circuit board adjacent the protective capacitor and projecting towards the second axial end of the housing, the second set of terminals being configured to electrically couple line and neutral wires of the second power cord to the protective capacitor,
   wherein the protective capacitor is configured to discharge when current draw by the load exceeds a current threshold.

2. The power adaptor of claim 1, wherein the protective capacitor occupies approximately 20% to 40% of a total length of the housing.

3. The power adaptor of claim 1, wherein the protective capacitor includes a capacitance in the range of approximately 15 uF to 60 uF and the load is configured to receive a maximum power input of at least 1100 watts.

4. The power adaptor of claim 1, wherein the load comprises a power tool having a motor, an inverter circuit for driving the motor, and a rectifier circuit for providing a direct current to the inverter circuit, the protective capacitor being configured to discharge when current draw by the motor exceeds the current threshold.

5. The power adaptor of claim 4, wherein the power tool further comprises a bus capacitor disposed between the rectifier circuit and the inverter circuit, the bus capacitor having a value such that, within each half cycle of AC voltage waveform associated with the power source, a time period within which the motor draws current from the bus capacitor is smaller than a time period within which the motor draws current from the power source, the protective capacitor being sized to supplement the bus capacitor of the power tool such that a sum of a capacitance of the protective capacitor and a capacitance of the bus capacitor is in between approximately 20 uF to 60 uF.

6. The power adaptor of claim 5, wherein the capacitance of the protective capacitor is greater than the capacitance of the bus capacitor.

7. The power adaptor of claim 1, wherein the housing comprises a main portion that houses the protective capacitor, two side portions formed at the first and the second axial ends, and at least one side wall extending in parallel to each of the side portions from the main portion to form an opening adjacent each of the side portions, the opening being configured for passage and mounting of a cable or a zip tie to the housing.

8. The power adaptor of claim 1, further comprising a wireless unit configured to provide a wireless signal for tracking a location of the power module.

9. The power adaptor of claim 1, wherein the resistor is mounted on a surface of the circuit board opposite the protective capacitor.

10. The power adaptor of claim 1, wherein the circuit board further comprises a conductive track electrically connecting a ground of the first power cord to a ground wire of the second power cord bypassing the protective capacitor.

11. The power adaptor of claim 1, wherein the housing includes two clamshells and a non-conductive gasket disposed between mating regions of the two clamshells, and the first and second power cords include non-conductive rims arranged to be confined by openings formed by the clamshells at the first and second axial ends of the housing, the non-conductive gasket and the non-conductive rims cooperating to seal the housing against ingress of water.

12. A power tool system comprising:
a power tool having a housing, a motor disposed within the housing, an inverter circuit disposed within the housing configured to switchably supply power to the motor from a power source, a rectifier circuit disposed between the power source and the inverter circuit to convert an alternating-current waveform of the power source to a direct-current waveform, and a bus capacitor disposed between the rectifier circuit and the inverter circuit, the bus capacitor having a value such that, within each half cycle of AC voltage waveform associated with the power source, a time period within which the motor draws current from the bus capacitor is smaller than a time period within which the motor draws current from the power source; and
a power adaptor including a protective capacitor electrically coupled between the power source and the power tool, the protective capacitor being sized to supplement the bus capacitor of the power tool such that a sum of a capacitance of the protective capacitor and a capacitance of the bus capacitor is in between approximately 20 uF to 60 uF, wherein the protective capacitor is configured to discharge when current draw by the motor exceeds a current threshold.

13. The power tool system of claim 12, wherein the power adaptor is integrally coupled to a power cord received by the power tool.

14. The power tool system of claim 12, wherein the power adaptor is detachably couplable to a power cord received by the power tool.

15. The power tool system of claim 12, wherein the capacitance of the protective capacitor is greater than the capacitance of the bus capacitor and the motor is configured to receive a maximum power input of at least 1100 watts.

16. A power tool comprising:
a housing;
a motor disposed within the housing and configured to receive a maximum power input of at least 1100 watts;
an inverter circuit disposed within the housing configured to switchably supply power to the motor from a power source;
a rectifier circuit disposed between the power source and the inverter circuit to convert an alternating-current waveform of the power source to a direct-current waveform;
a bus capacitor disposed between the rectifier circuit and the inverter circuit, the bus capacitor having a value such that, within each half cycle of AC voltage waveform associated with the power source, a time period within which the motor draws current from the bus capacitor is smaller than a time period within which the motor draws current from the power source; and
a protective capacitor electrically coupled between the power source and the rectifier circuit, the protective capacitor being sized to supplement the bus capacitor of the power tool such that the capacitance of the protective capacitor is greater than the capacitance of the bus capacitor and a sum of a capacitance of the protective capacitor and a capacitance of the bus capacitor is in between approximately 20 uF to 50 uF, wherein the protective capacitor is configured to discharge when current draw by the motor exceeds a current threshold.

* * * * *